Feb. 26, 1952        G. S. VERNAM        2,587,253

TELEGRAPH SWITCHING SYSTEM

Filed Nov. 20, 1948        10 Sheets-Sheet 1

INVENTOR:
G. S. VERNAM
BY
*M. R. Marsh*
ATTORNEY

Feb. 26, 1952     G. S. VERNAM     2,587,253
TELEGRAPH SWITCHING SYSTEM
Filed Nov. 20, 1948     10 Sheets-Sheet 5

INVENTOR.
G. S. VERNAM
BY
*F. R. Marsh*
ATTORNEY

INVENTOR.
G. S. VERNAM

Feb. 26, 1952  G. S. VERNAM  2,587,253
TELEGRAPH SWITCHING SYSTEM
Filed Nov. 20, 1948  10 Sheets-Sheet 10
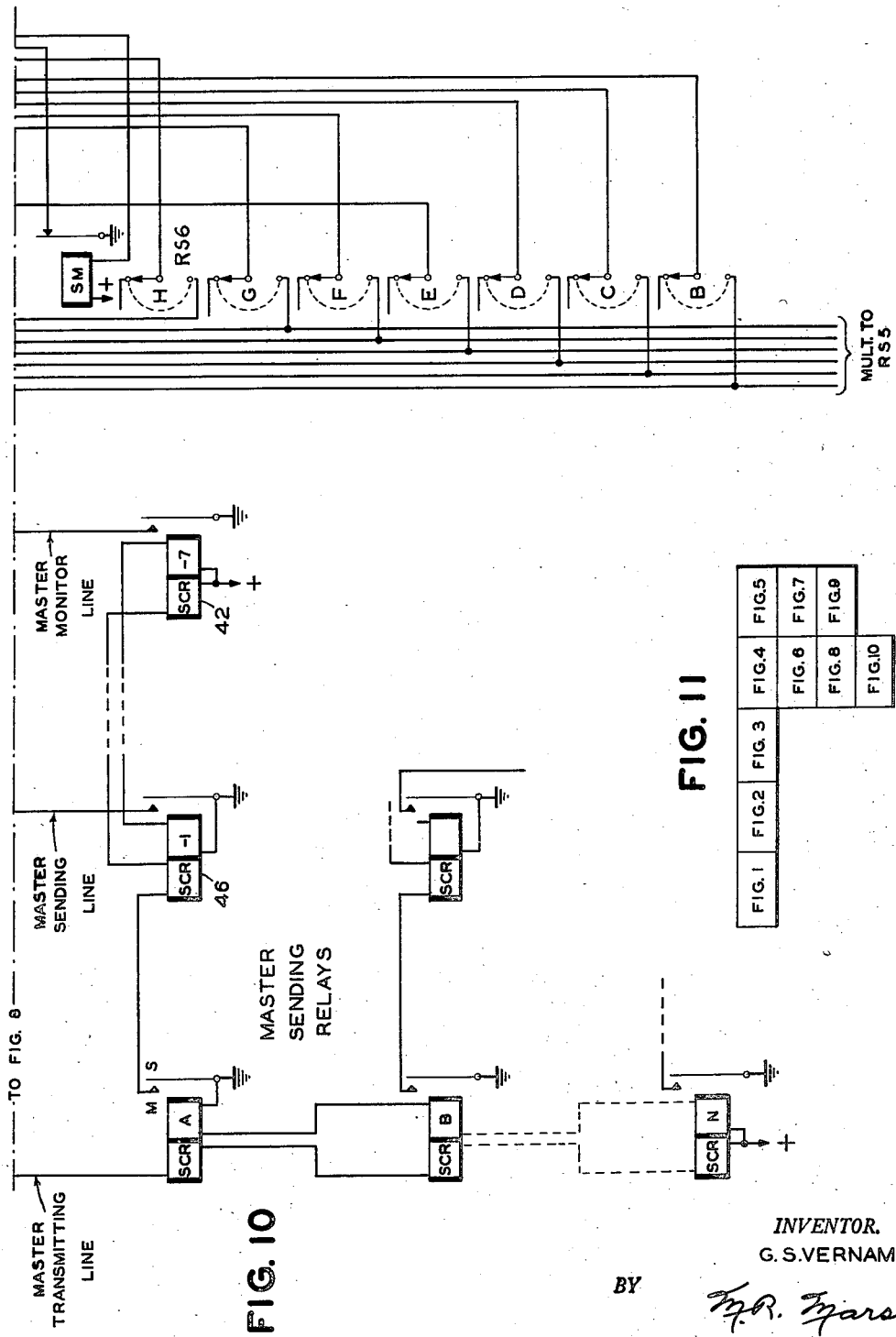
INVENTOR.
G. S. VERNAM
BY
ATTORNEY

Patented Feb. 26, 1952

2,587,253

UNITED STATES PATENT OFFICE 2,587,253

TELEGRAPH SWITCHING SYSTEM

Gilbert S. Vernam, Hackensack, N. J., assignor to The Western Union Telegraph Company, New York, N. Y., a corporation of New York Application November 20, 1948, Serial No. 61,280

11 Claims. (Cl. 178—2)

This invention relates primarily to telegraph switching systems and more particularly to reperforator switching systems of the type disclosed in the copending application of G. G. Light, Ser. No. 681,860, filed July 8, 1946, and entitled "Telegraph Reperforator Switching System."

The above-mentioned copending application discloses a switching system whereby messages received at a relay center are stored in a perforated and printed tape and are subsequently directed to the desired outgoing lines by switching equipment controlled by manually operable push buttons. In operation an attendant reads the destination on the tape as the message is received and actuates a push button whereupon the message is transmitted to the destination represented by the actuated push buttons.

Each outgoing circuit in the above-mentioned copending application, as well as hereinafter described spill-over type positions, have associated therewith a so-called numbering machine which functions to append to each message transmitted over its respective circuit, a message sequence number. These sequence numbers along with certain other information are transmitted automatically each time a connection is made to an outgoing circuit and the numbers facilitate the tracing of lost or misrouted messages.

One of the objects of the present invention is to provide a circuit arrangement operable in conjunction with systems of the type disclosed in the above-mentioned copending application whereby a single message may be broadcast simultaneously to a number of outgoing circuits.

Another object of the present invention in connection with the above is to provide a recording means, such as a page printer, which automatically records at the switching office the sequence numbers and other information transmitted by the automatic message numbering machines to each of the individual lines to which a multiple address message is broadcast, together with the message.

Another object of the invention is to provide a system wherein the sequence numbers of a multiple address message from a switching center are transmitted one after the other and the accompanying message is transmitted to the desired sending circuits simultaneously.

The above and further objects of the invention will be more apparent from the following detailed description wherein reference is made to the accompanying drawings, in which:

Figs. 4 to 10 show primarily the automatic numbering circuits for a single message sending circuit and a master sending circuit and the manner in which they co-operate; and Fig. 11 shows the manner in which Figs. 1 to 10 may be arranged with respect to each other to form a complete illustrative embodiment of the present invention.

As pointed out, the principles of the present invention are particularly applicable to the system disclosed in the said copending application Ser. No. 681,860 and the same is included herein by reference. Such systems sometimes have what may be termed a spill-over position in the switching office to which messages are switched when they are destined to a closed-down office or to an office which for some reason can not conveniently be reached immediately.

Figure 1:
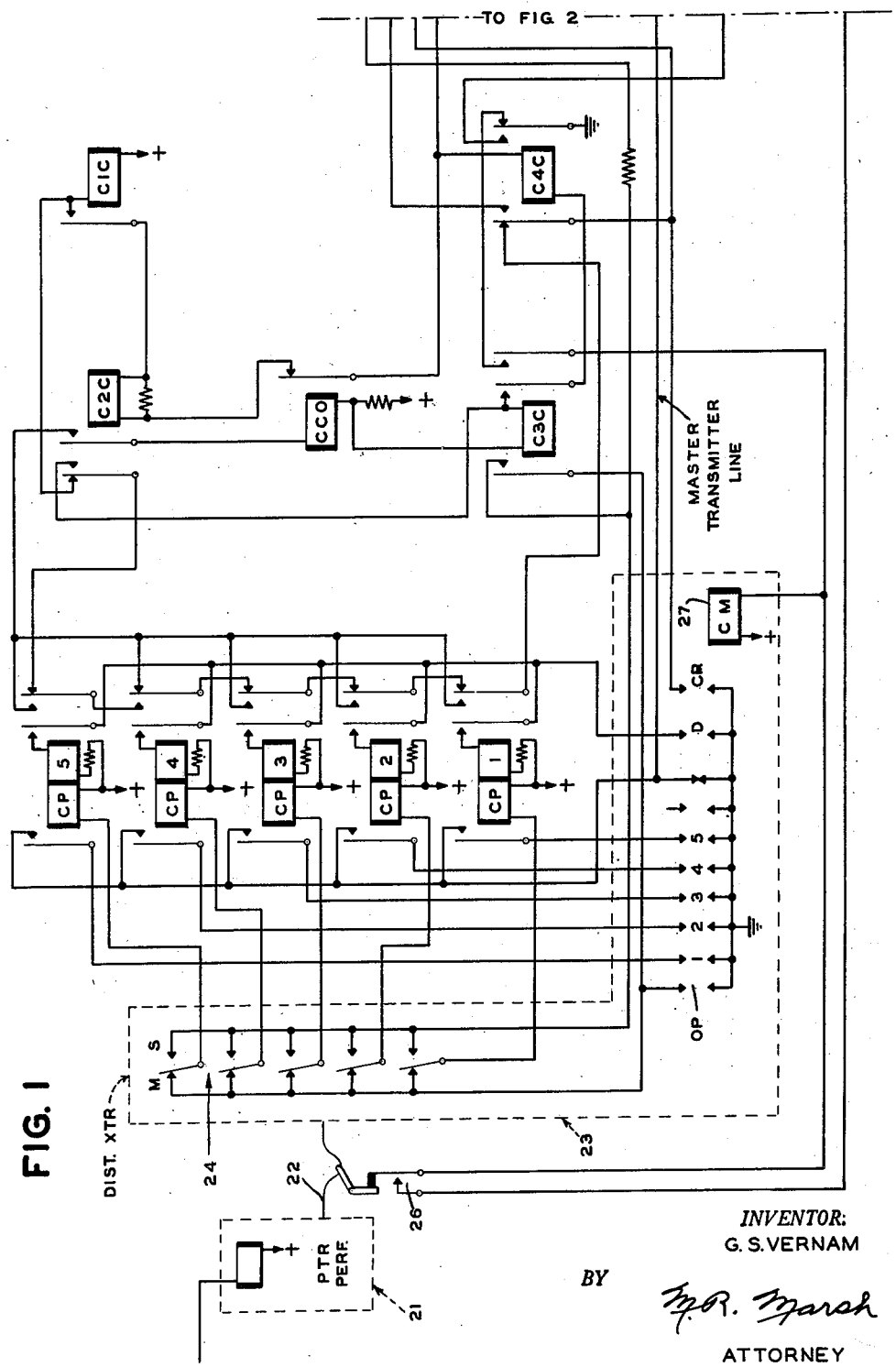
Figs. 1 to 3 show primarily the "Master" or multiple address transmitter distributor of a master sending circuit together with some of the associated control relays.

In accordance with the present invention a similar position called a "master sending" position is provided in the system of the above-mentioned copending application to which the multiple address messages are switched from the local receiving positions in much the same manner as messages are switched to the spill-over position or to an outgoing line. Since the above-mentioned copending application discloses the circuits and equipment for switching to an individual sending position and similar circuits are employed to switch messages from a local receiving position to a spill-over or master sending position, such circuits will not be included herein. Accordingly it will be assumed that the printer perforator 21 of Fig. 1 has circuits associated therewith whereby master or multiple address messages are locally switched thereto and appear in the tape 22 issuing from the printer perforator. Adjacent the printer perforator 21 and controlled by the perforated tape 22 is a so-called master message distributor transmitter 23 with associated control circuits and relays hereinafter described.

In the system described, messages in the storage tapes are separated by so-called letter characters which have all five code positions marking and when these appear between a message, the control circuits are arranged to idle such characters in the tape through the associated transmitter. As long as the letters codes appears over the pins of the transmitter 24, included in the distributor transmitter 23, and the tape lever contacts 26 remain closed, indicating a loop in the tape 22, the clutch magnet 27 of the distributor transmitter releases its clutch and the tape 22 is advanced until the first character of the following message appears over the transmitter sensing pins. The first character of the message, which will have one or more pulses thereof spacing, will complete a circuit for operating the master message waiting relay MMW as timed by contacts OP and CR of the distributor transmitter closing. The operating circuit extends from ground at contact CR through a back contact and tongue of relay MDD, the winding of relay MMW, a back contact and tongue of relay MSL, the spacing bus bar of the transmitter 24 and through one of the tongues thereof and the coil of one of the pulse relays CP1 to CP5 to potential. As relay MMW operates, it establishes a locking circuit for itself, opens the circuit to the clutch magnet 27 of the transmitter distributor to stop further operation thereof, and completes a circuit for the operation of the primary lock relay MPL. As the latter relay operates, it completes a circuit for lighting the message waiting lamp which circuit includes back contacts of relays MSL and NAS. The primary lock relay MPL in operating also applies negative potential through a front contact and tongue thereof to the alarm control lead which extends through a tongue and back contact of relay NCS to the cathode of an OA4G tube 28 and its associated timing condenser 29. If the master sending circuit is not started within approximately twenty seconds after the operation of relay MPL, condenser 29 will charge through an associated resistance 31 to the point where the tube 28 becomes conducting and thereby completes a circuit for operating the alarm signal relay NAS. The operation of relay NAS transfers the signal lamp circuit from the steady ground to the interrupted ground through contacts 32 operated by the printer perforator 21. This causes the message waiting lamp to flash and inform the attendant of the non-started condition of the master sending circuit.

Figure 2:
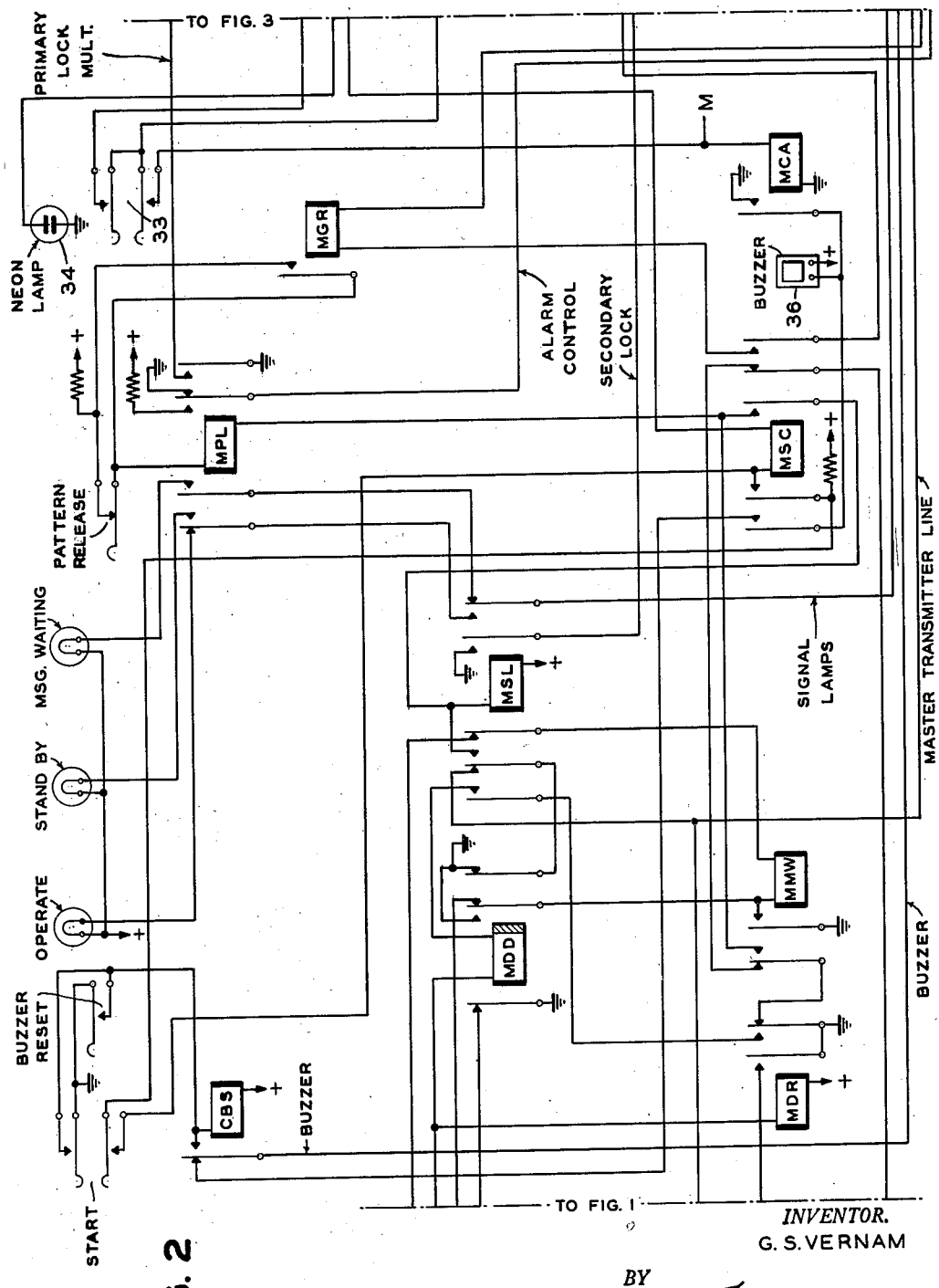
Figure 3:
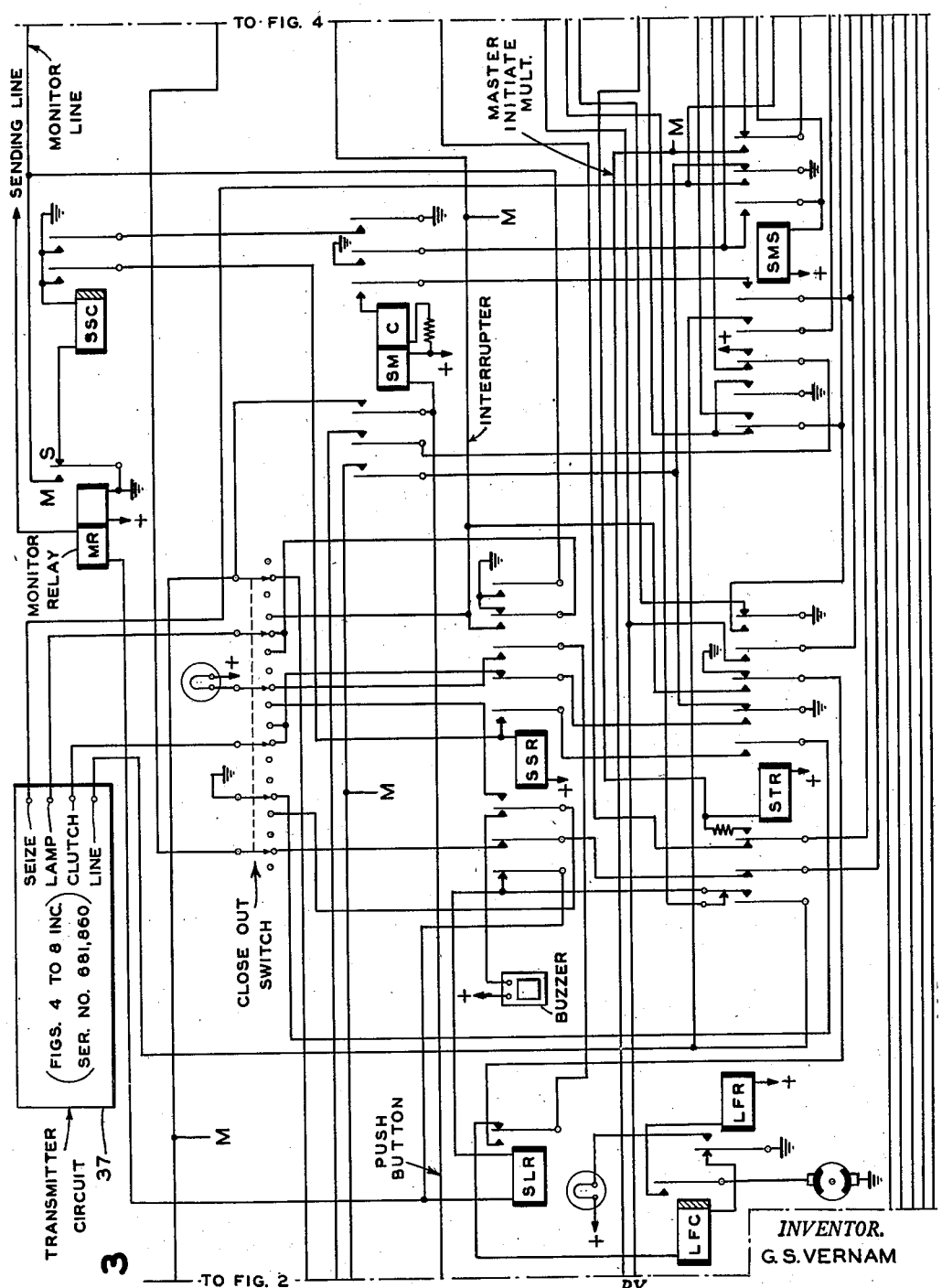
Figure 4:
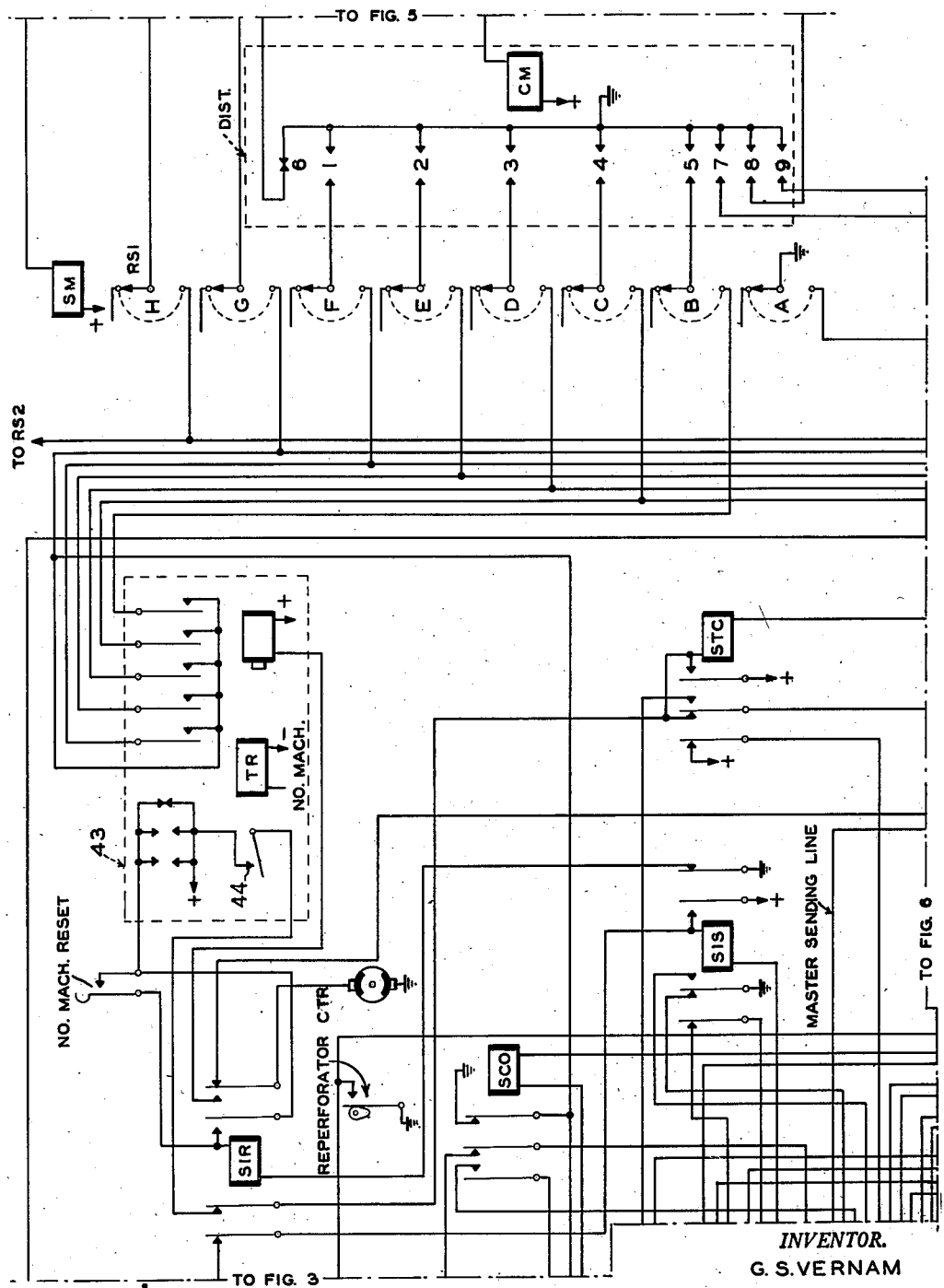

Each outgoing circuit to which a multiple address message may be transmitted, simultaneously with transmission thereof to other outgoing circuits, has associated therewith control circuits such as those disclosed mainly in Figs. 2 and 3. These control circuits include a so-called pattern push button, such as 33, for establishing a pattern of destinations to which a multiple address message may be sent. When the primary lock relay MPL of the master sending circuit operates, the pattern push buttons, such as 33, have the lowermost terminals thereof grounded by circuits which include the right hand arm and center contact of associated closeout switches. Thereafter the attendant operating the pattern push buttons, such as 33, corresponding to the destinations in the tape to which the multiple address message is to be sent, extends the above ground through one of the coils of associated sending master cut-in relays SMC to potential. Thus relays SMC of the sending circuits or lines to which the multiple address message is to be sent are operated, and assuming none of the sending lines have been closed out, there will be a cut-in relay SMC operated with each one of the pattern push buttons 33 depressed. Only one SMC relay is shown in the drawings and similar relays associated with the various other sending lines are operated in the same manner. The present description will be confined to the operation of the single SMC relay shown and these several similar relays, as well as others hereinafter described, have a number of indicated or obvious circuits thereof arranged and connected in multiple. Some of these multiple connections are indicated by the letter M at the point where the connection is made. As relay SMC operates, it locks up through contacts of the primary lock relay MPL and connects a neon lamp, such as 34, one of which is associated with each pattern push button, to an interrupted circuit thereby causing the lamp to flash.

If the attendant actuates a pattern push button, such as 33, of a closed-out line, the associated SMC relay does not operate, as the close-out switch of such a line opens the direct ground to the push button. Operating such a push button closes a circuit from relay SMC to ground through close-out alarm relay MCA. The low current in this circuit operates relay MCA but does not operate relay SMC and the former in operating causes a warning buzzer 36 to function and the neon push button lamp 34 does not light. Thus the attendant is advised that a closed out line has been included in the pattern.

The rectangle 37 of Fig. 3 represents a single message transmitter circuit such as that shown in Figs. 4 to 8, inclusive, of the said copending application and has extending therefrom four leads designated Line, Clutch, Lamps and Seize. A single message transmitter circuit is connected to a sending line over these four leads and the master sending circuit is also connected to the sending circuit or line including these four leads. When a sending line is busy by reason of the fact that a single message transmitter circuit is transmitting a single message thereto, ground is applied to the seize lead and the associated first seize relay SIS will be operated. With the relay SIS operated, the circuit to the coil of relay SMS is held open and thereby prevents relay SMS from operating. However, during such times the push button lamp 34 lights and continues to flash until the sending line becomes idle.

If the sending line is idle or, if it is busy, when it becomes idle, relay SMC can close the circuit to operate relay SMS through a circuit including back contacts of relay SIS. When relay SMS operates, it locks itself up, grounds the seize lead and transfers the circuit to the push button lamp 34 from the intermittent or interrupted potential source to steady potential whereupon it is steadily illuminated. The grounding of the seize lead prevents any single message transmitter circuit connected in multiple to the four leads from seizing the particular sending line, and thus gives the master sending circuit priority over single message transmitter circuits that may be waiting to seize the line. The ground on the seize lead usually operates relay SIS immediately.

After setting up the pattern of the desired sending lines to which the multiple address message is to be transmitted, by operating the pattern push buttons such as 33, the attendant next depresses the Start push button. The operation of the Start push button completes a circuit for operating the start control relay MSC, provided at least one of the SMC relays has been operated. As relay MSC operates, it locks itself up and completes a circuit for the operation of the secondary lock relay MSL through front contacts of relay MSC and MMW and back contacts of disconnect relay MDR. As relay MSL operates it locks itself and relay MPL directly through contacts of relay MSL and disconnect delay relay MDD independent of relay MNW. As relay MSL operates it releases relay MMW which in turn extinguishes the message waiting lamp and completes a circuit for lighting the stand-by lamp.

If relay NAS is operated at this time, the stand-by lamp is caused to flash. The operation of buzzer stop relay CBS through the start key contacts, locking through contacts of relay NAS (Fig. 9), prevents the buzzer from operating.

Figure 9:
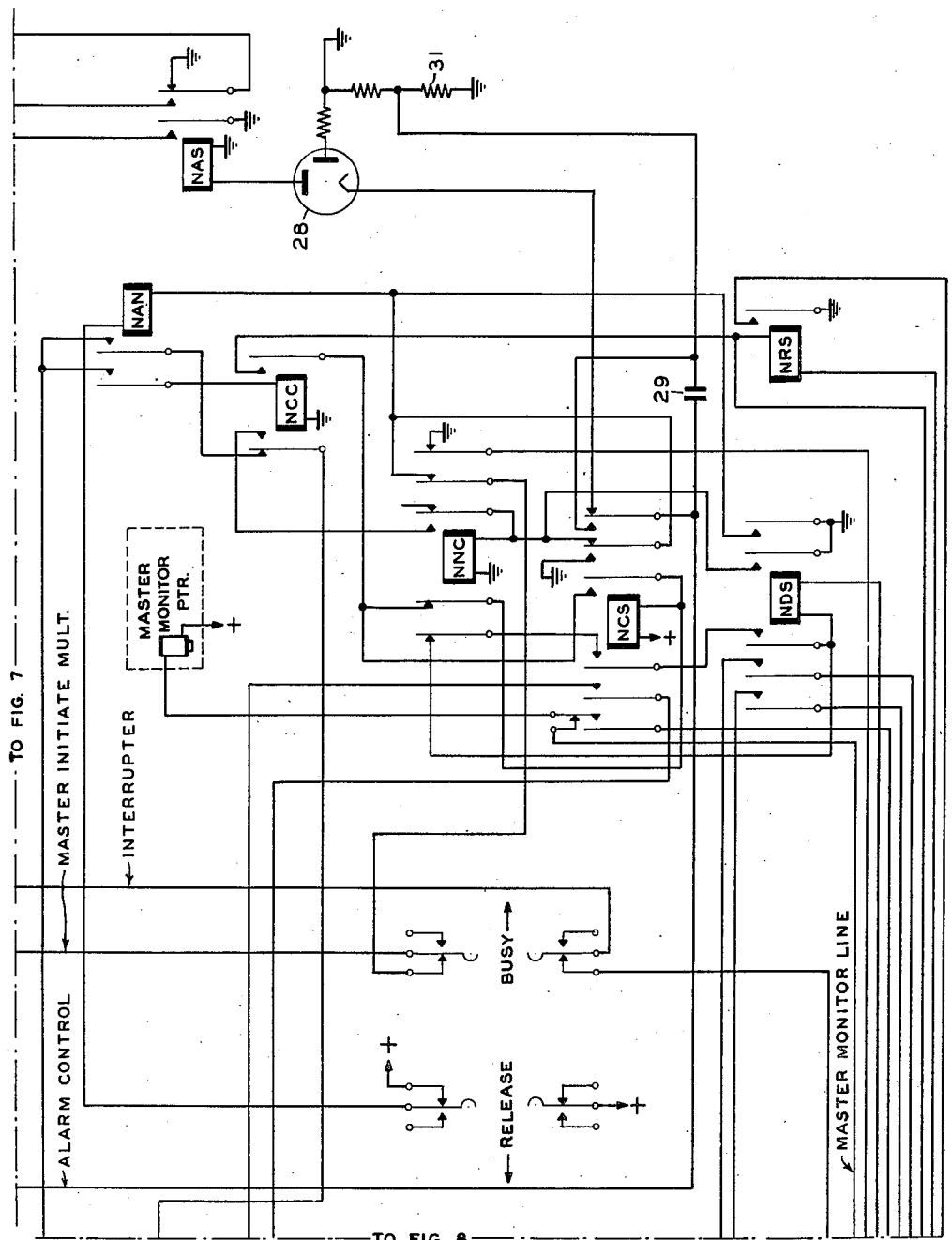

If any of the SMS relays of the desired sending lines have operated by this time, relay MSC closes the master initiate circuit to operate the guard relay MGR and the answer-next relay NAN (Fig. 9). This circuit extends from potential through the winding of relay NAN, back contacts of relay NNC, the winding of relay MGR, front contacts of relay MSC, front contacts of any operated SMS relays, back contacts of cut-off relay SCO, back contacts of transfer relay STR, and front contacts of relay SIS to ground.

When a first seize relay SIS has been operated for master sending, with a master seize relay SMS also operated, it removes ground from the corresponding bank contacts associated with the H wiper of rotary switch RS3 associated with the master sending circuit. The corresponding H bank contacts of rotary switches RS1 and RS2 remain grounded through front contacts of an operated master seize relay SMS. This arrangement insures that rotary switch RS3 will cut in only on lines that have been seized for master sending, while rotary switches RS1 and RS2 will cut in only on lines that have been seized for individual messages.

At this time, operated relay NAM connects the rotary switch step magnet SM of rotary switch RS3 to its H wiper. The self-interrupting step magnet operates and releases, stepping the switch wipers until the wipers reach the open point associated with a sending line that has been seized for master sending, assuming both SIS and SMS relays are operated. The open switch bank contact on the H level removes the short circuit from around the coil of relay NCC whereupon the latter operates by circuit through front contacts of relay NAN and the coil of step magnet SM3. The current in this circuit is limited to below that required to operate the step magnet SM but is sufficient to operate relay NCC and its contacts close a circuit for operating relay NRS, which controls the stepping magnet SM of rotary switch RS6. At this time, a point on the H level of rotary switch RS6, corresponding to the point at which the wipers of rotary switch RS3 are stopped, is grounded through the A level of the latter switch and the wipers of rotary switch RS6 will advance until they reach the corresponding points. Thus, the wipers of rotary switches RS3 and RS6 are advanced until they reach the bank terminals of one of the sending lines that has been seized for master sending.

*Sending automatic message number*

When rotary switches RS3 and RS6 reach the point or bank terminals corresponding to one of the sending lines, a circuit is completed through the A level of rotary switch RS3 and the H level of rotary switch RS6, a front contact of relay NCC, the back contact of relay NNC and the coil of relay NCS to potential. Thereupon relay NCS operates, locks itself up and performs a number of functions which include: the grounding of the outgoing sending circuit through the normally closed sixth or rest pulse contacts of the distributor 41 and the wiper G of rotary switch RS3; connects the so-called master monitor printer line through the wiper D of rotary switch RS6 to the marking contact of the monitor relay MR in the sending line; opens the circuit to the cathode of tube 28, releasing relay NAS if operated; short circuits and discharges condenser 29 thereby recycling the tube timing circuit; and applies battery to a circuit to operate the distributor start relay NDS and the sending cut-off relay SCO through the F wiper of rotary switch RS6. As relay NAS releases, it switches the stand-by lamp from a flashing to a steady condition and releases relay CBS.

The operation of relay NDS locks itself and relay SCO in series so that they do not release when relay NNC operates. Front contacts of relay NDS hold relay NAN operated and short-circuit the coil of guard relay MSR whereupon the latter releases. Other contacts of relay NDS operate relay NCC and still others complete a circuit to clutch magnet CM of distributor 41 through the B wiper of rotary switch RS6 to ground. Still another front contact of relay NDS prepares a circuit from contacts No. 8 of the distributor 41 through the C level of RS6 and back contacts of reset relay SIR to the operating magnet of the message numbering machine 43. The message numbering machine may, for example, be of the type disclosed in U. S. Patent No. 2,193,- 809, issued March 19, 1950, which generates and transmits permutation type code signals such as those representing numerals along with messages, whereby the messages are or may be identified.

As relay SCO operates, it removes ground from the sending line and closes an additional or secondary locking circuit for relay SMC. Relay SCO also removes ground from the master initiate lead which may remain grounded at this time through relays of other sending lines which are multipled thereto.

To summarize the operation of some of the relays up to this point, the following relays are energized: the primary lock relay MPS, the secondary lock relay MSL and the start control relay MSC, all of the master transmitting circuit; the master cut-in relays SMC of the several sending lines selected by the attendant, and master seize relays SMS and the first seize relay SIS of those lines of the selected group that are idle. Also operated is the sending cut-off relay SCO of one of these idle lines that is connected through rotary switches RS3 and RS6 to the numbering circuit, and relays NAN, NCC, NCS, NDS and NNC of the automatic numbering circuit. The master monitor printer and the distributor 41 are now connected to the monitor relay MR and to the numbering machine 43, respectively. Relay NDS has operated the clutch magnet CM of the distributor to initiate the same into operation which in turn transmits to the sending line the characters set up in the numbering machine. These characters include the circuit identifying characters and the message serial number set up in the numbering machine 43, and during transmission thereof the associated distributor 41 functions in the manner described in the above-mentioned copending application.

The clutch magnet CM of the numbering machine 43 is pulsed through the eighth set of contacts of the distributor 41 over a circuit including a front contact of relay NDS, the C wiper of rotary switch RS6 and a back contact of relay SIR. These contacts close near the end of each revolution of the distributor and step the drums of the numbering machine to its next position, and this procedure continues until it has completed its full cycle of operation wherein a predetermined number of characters, such as ten, have been transmitted. Since the output from the numbering machines extends through the coil of the monitor relay MR, it will operate in accordance therewith and repeat the signals over the monitor line which includes the D wiper of rotary switch RS6 and a tongue and front contact of relay NCS to the master monitor printer where they will be recorded.

Transfer circuit

As the numbering machine completes its cycle of operation and is stepped into its last or tenth position following the transmission of the ninth or next to last character, its normally open contacts 44 close and establish a circuit for operating the transfer control relay STC. This circuit originates at ground and extends through a front contact of relay NNC', the G wiper of rotary switch RS4, the coil of relay STC, back contact of relay SIR, and contacts 44 to potential. However, relay STC is prevented from operating immediately or before the transmission of the tenth or last character as the winding thereof is short-circuited through a back contact of the said relay, the wiper E of rotary switch RS6 to contacts No. 7 of the distributor 41. This No. 7 contact is closed at the time the transfer contacts 44 of the numbering machine close and thus prevent immediate operation of relay STC. When contact No. 7 opens at the start of the transmission of the tenth or last character of the numbering machine, relay STC operates and locks up.

As relay STC operates, it extends a circuit from the No. 7 contacts of the distributor through the coil of transfer relay STR to potential and on closure of the contacts No. 7 at the end of the tenth character relay STR operates and locks up through a circuit including a front contact of relay SIS to ground. The subsequent opening of the distributor contact No. 8, steps the numbering machine 43 to its start position from whence it can be initiated into another cycle of operation.

The operation of relay STR also transfers the sending line from the numbering machine circuit through front contacts of the master seize relay SMS and the master sending line leading to a marking contact of a master send relay, such as 46, associated with this particular sending line of the master send relay group. The operation of relay STR also releases relays SCO and NDS but the secondary lock circuit for relay SMC remains closed through front contacts of relay STR when relay SCO releases. The release of relay NDS opens the circuit to the clutch magnet CM to stop the distributor 41 and also releases relay NAN. Relay NAN in releasing releases relay NCC which in turn releases relay NCS. The latter relay NCS releases relay NNC thus restoring the numbering circuit to its normal condition.

At this point in the operation, the message sequence number from the numbering machine 43 has been transmitted to its respective sending line of the group set up in the master sending pattern. This sequence number has been recorded by the master monitor printer and the transfer relay STR of this line is locked up, transferring the sending line to the master send relay 46, grounding the H bank contact of rotary switch RS3 and removing one ground through back contacts of relay STR from the master initiate circuit. The master initiate circuit is connected in multiple to all the sending line circuits to which a master message may be transmitted and accordingly may at this time be grounded through one or more of these circuits. Relay STR has also locked the master seize relay SMC of the particular line up to contacts of the common secondary lock relay MSL, and relay SMC is holding relays SMS and SIS energized.

Transmitting message sequence numbers to other lines

When relay NNC releases as set forth, it connects relay NAN to the master initiate lead which is still grounded through closed contacts of the SIS relays of other lines of the selected group, provided such lines are idle and have been seized, through operation of their SMS and SIS relays, and further provided that the numbering machines associated therewith have not transmitted their message sequence number. The latter condition is prevalent as long as the transfer relays STR of such lines are not operated. The reconnection of the answer-next relay NAN to the master initiate lead initiates another master sending circuit of one of the lines of the selected group into operation wherein its message sequence number is transmitted to the associated sending line in the manner described and such operations are repeated for each line in the selected group. All the lines of the selected group thus have transmitted thereto respective message sequence numbers and all of these numbers are recorded by the master monitor printer. To prevent overprinting at the end of a line of print, assuming the master monitor printer is of the page type, the first two characters transmitted from the numbering machine are preferably line feed and carriage return characters. With this arrangement each message sequence number printed by the master monitor printer appears on a separate line.

Transmitting the multiple address message

As set forth hereinbefore, the transmission of a message sequence number to a line of the selected group results in the operation of the SMC, STR and SMS relays of such lines and for the time being it will be assumed that one of the designated lines has not yet been seized. For this condition, the non-seized line will have its SMC relay operated and its SMS relay unoperated. With a set of relays in this condition, the master start control relay MSC remains locked up. When the unseized line becomes idle, its STR relay releases and its SMS operates whereupon the start control relay MSC is still locked up from ground through a back contact of relay STR. The unseized line thereupon is seized and the message sequence number transmitted thereto which is followed by the operation of its STR relay and, assuming the particular sending line is the last one of the designated group, the operation of its STR relay removes the last ground from relay MSC whereupon it releases.

The release of the master start control relay MSC opens the master initiate lead thereby preventing any further operation of the answer-next relay NAN, releases the primary lock relay MPS which causes the stand-by lamp to be extinguished and the operate lamp to be illuminated. Furthermore, release of relay MSC closes the clutch circuit to the clutch magnet 27 of the master message distributor transmitter 23 to initiate the same into operation. As will be recalled, the master message distributor transmitter 23 was stopped with the first message character over the pins of the transmitter 24 and pins associated with holes in the tape will be against the marking bus bar M so that circuits will be established through the operating coils of corresponding pulse relays CP1 to CP5 to the OP contact. Contact OP closes immediately after the distributor starts to rotate and thereby circuits are completed for operating the pulse relays corresponding to the holes in the first message character over the sensing pins of the transmitter 24. Contact D of the distributor transmitter 23 is arranged to close before contact OP opens and thereby establishes locking circuits for the operated ones of the pulse relays CP1 to CP5. The operation of a pulse relay places potential on its respective contact of the distributor and as these contacts close the combination set up on these segments is transmitted to the master transmitter line and in timed relation therewith the tape is stepped ahead to place a new perforation over the sensing pins. At the end of the first revolution of the distributor, contact D of the distributor transmitter 23 opens to release the operated CP relays and then contact OP closes at the beginning of the next revolution to set the next character signal combination up in the pulse relays. Such operations of the master message distributor transmitter 23 continue until the transmitter stops at the end of the message, in the manner hereinafter pointed out, or when the clutch magnet circuit is opened by the tape lever operating tape lever contacts 26.

As the message characters are transmitted to the master transmitter line, which extends to the master sending relays, the relays are operated in accordance therewith and repeat these signals over the master sending lines. Since the master sending line of each outgoing line of the selected group of outgoing lines will at this time be connected to its master sending relay, the message will be simultaneously transmitted to all these lines. The message is also repeated to the master monitor line which at this time is connected to the master monitor printer and, accordingly, it will record the entire message. Thus, the message sequence numbers of the multi-address message of all the lines are first recorded in turn on the master monitor printer and are followed by the entire text of the multi-address message.

*End of message*

In the arrangement herein described, each message is terminated by an end-of-message signal consisting of two carriage return characters followed by one or more letters characters. The transmission of an end-of-message character through the master message distributor transmitter 23 functions to release the lines to which the distributor was transmitting in much the same manner that the transmission of an end-of-message signal effects the release of an individual sending line in the above mentioned copending application.

The end-of-message combination is detected by counting relays C1C, C2C, C3C, and C4C. Relay C1C operates in conjunction with the detection of the first carriage return code combination and its operation is timed by the CR contacts of the distributor transmitter 23. Relay C2C operates when contacts CR open and prepares a circuit for operating either relay CCO or C3C on the next closure of the CR contacts. Relay CCO operates if a character code following a first carriage return code is any other code and relay C3C operates when one carriage return code immediately follows another. During the transmission of the letters character following the two carriage return characters of an end-of-message signal, a circuit is completed for the operation of the master disconnect relay MDR. As relay MDR operates it opens the circuit to the clutch magnet 27 of the distributor transmitter whereupon the distributor is stopped. In conjunction with the last cycle of operation of the distributor wherein the last character of the end-of-message signal is being transmitted, the CR contacts open and relay MDR locks up through the winding of the disconnect delay relay MDD and contacts of relays MSL and MDR to ground. This circuit operates relay MDD which releases the counting relays C1—4C together with relay MSL.

The release of the master secondary lock relay MSL opens the secondary lock circuits of all the SMC relays causing all operated ones of these relays to release. As the SMC relays release, they in turn cause associated SMS and SIS relays to release, and the latter effect release of the operated STR relays. The release of relay MSL also releases relays MDR and MDD and closes a circuit from the master send relays through contacts of relay MDD to ground, thereby holding the master monitor printer in a marking condition while letters characters following the end-of-message signal are being idled through the transmitter 24.

Other back contacts of relay MSL connect relay MMW to the spacing bus bar of the transmitter 24 and during the transmission of the letters character following the two carriage return characters of the end-of-message signal, the tape is stepped ahead to the next character. If this is another letters character, the transmitter will step, after MDR releases, until stopped by the operation of the tape lever arm contacts 26 or by relay MMW operating as the first character of the next message stepped over the pins of the transmitter.

*Primary and secondary locks*

As described, the SMC relays when first operated, lock up through contacts of primary lock relay MPL. While the message members are being transmitted, an additional lock is provided for each SMC relay through contacts of the secondary lock relay MSL. When all the message sequence numbers have been transmitted and the start control relay MSC releases to initiate operation of the transmitter distributor 23, relay MPL releases and removes the primary lock. When relay MPL releases it also removes ground from all the individual push buttons such as 33.

With such an arrangement the attendant can release all circuits to change group of selected outgoing lines by operating the pattern release key provided it is done before the start key is operated. Operation of the pattern release key releases relay MPL, opening the primary lock circuit before relays MSC and MSL have operated to close the secondary lock circuit.

After the transmission of the various sequence numbers has started, the secondary lock is applied to the SMC relays of the sending lines whose sequence numbers have been or are being transmitted. This makes it possible to release from the pattern, or the selected group of sending lines, any busy lines that might unduly delay transmission of the multiple address message to the idle lines of the group by simply depressing the pattern release key and thereby removing the primary lock.

If it is assumed that a message is to be sent to a group of lines, one of which is busy transmitting a relatively long message, and after the message numbers have been transmitted to all except the busy line, relay NCS remains released, closing the cathode circuit to the tube 28. Approximately twenty seconds later, depending upon the time delay characteristics of the delay circuit associated with the tube 28, a circuit is completed for operating alarm signal relay NAS. The operation of relay NAS flashes the stand-by lamp and operates the alarm buzzer 36. The buzzer may be stopped by operating the buzzer reset key to operate relay CSB, but the stand-by lamp continues to flash and the neon push button lamp flashes to indicate the particular circuit that is holding up transmission of the message. When this condition prevails the attendant can transmit the message to a spill-over position by operating an appropriate spill-over push button so as to obtain another tape for subsequent separate transmission to the busy line. By depressing the pattern release key, the busy line can then be released and transmission to the idle lines of the group initiated. In the above instance the guard relay MGR operates while the rotary switches are seeking the spill-over line and thus prevents the release of relay MPL. When a message number has been transmitted to the spill-over position, transmission of the message will begin and although an extra destination can be added to the pattern as described prior to the transmission of the message, it can not be done after message transmission starts since relay MPL is at such times released.

Figure 5:
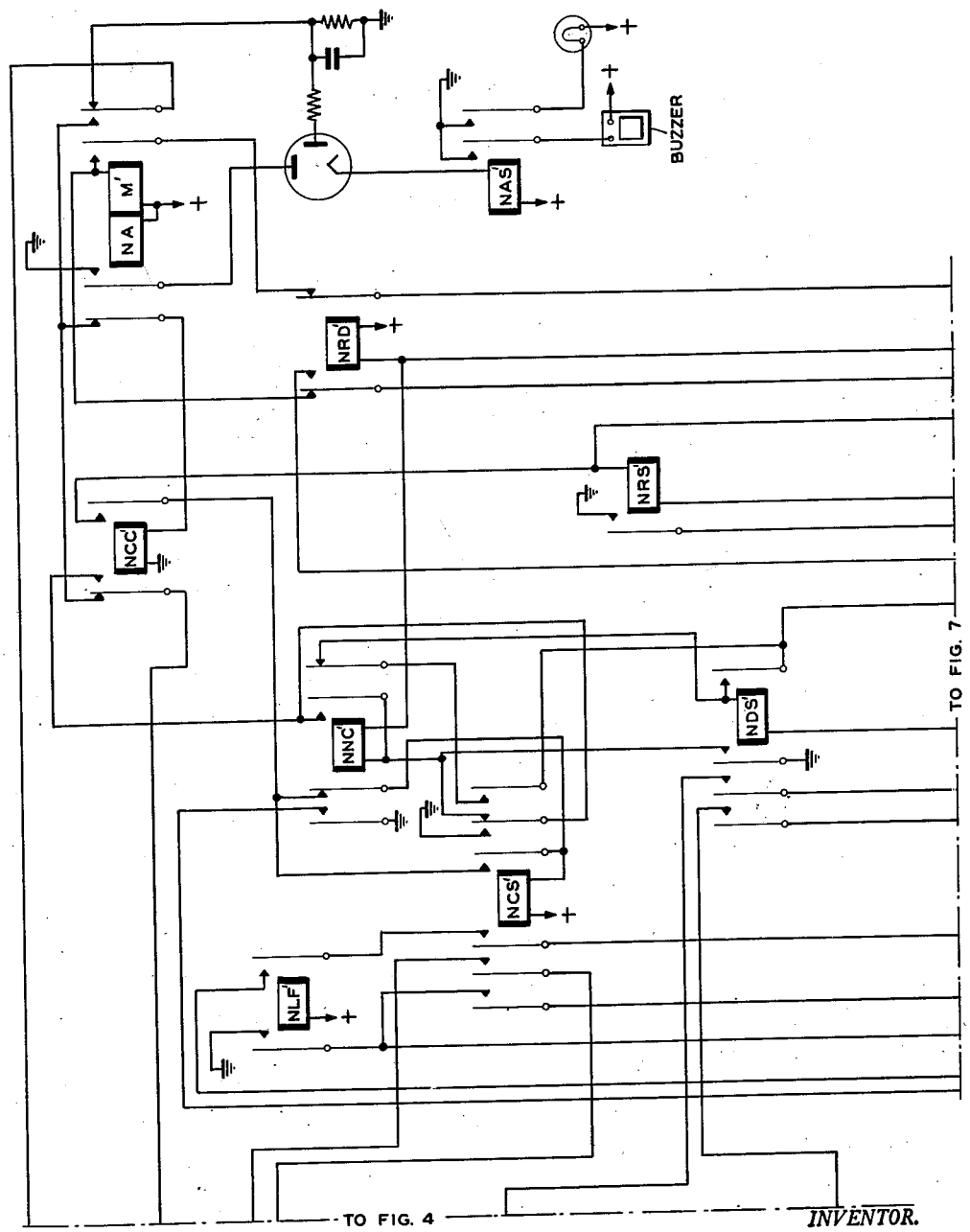
Figure 6:
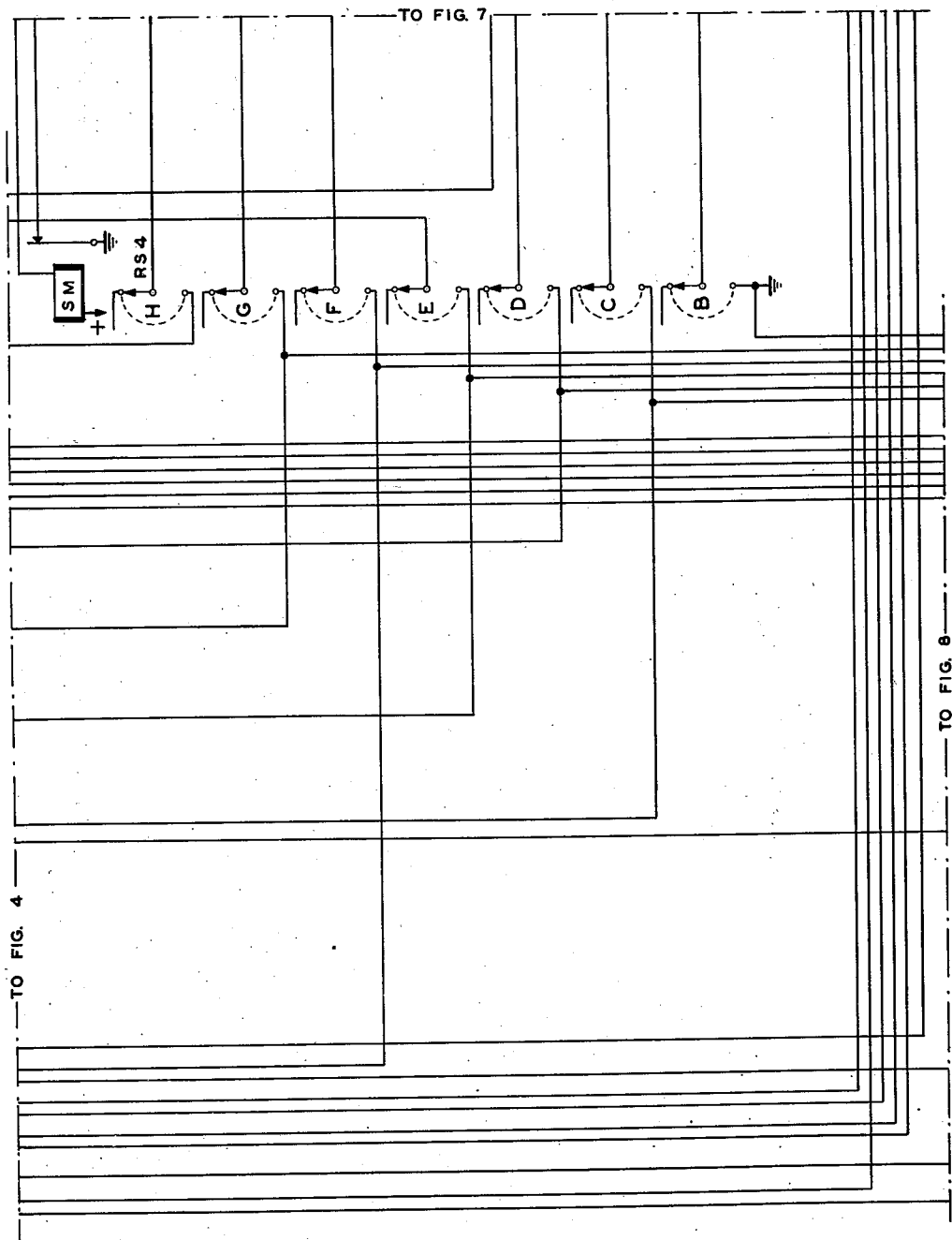
Figure 7:
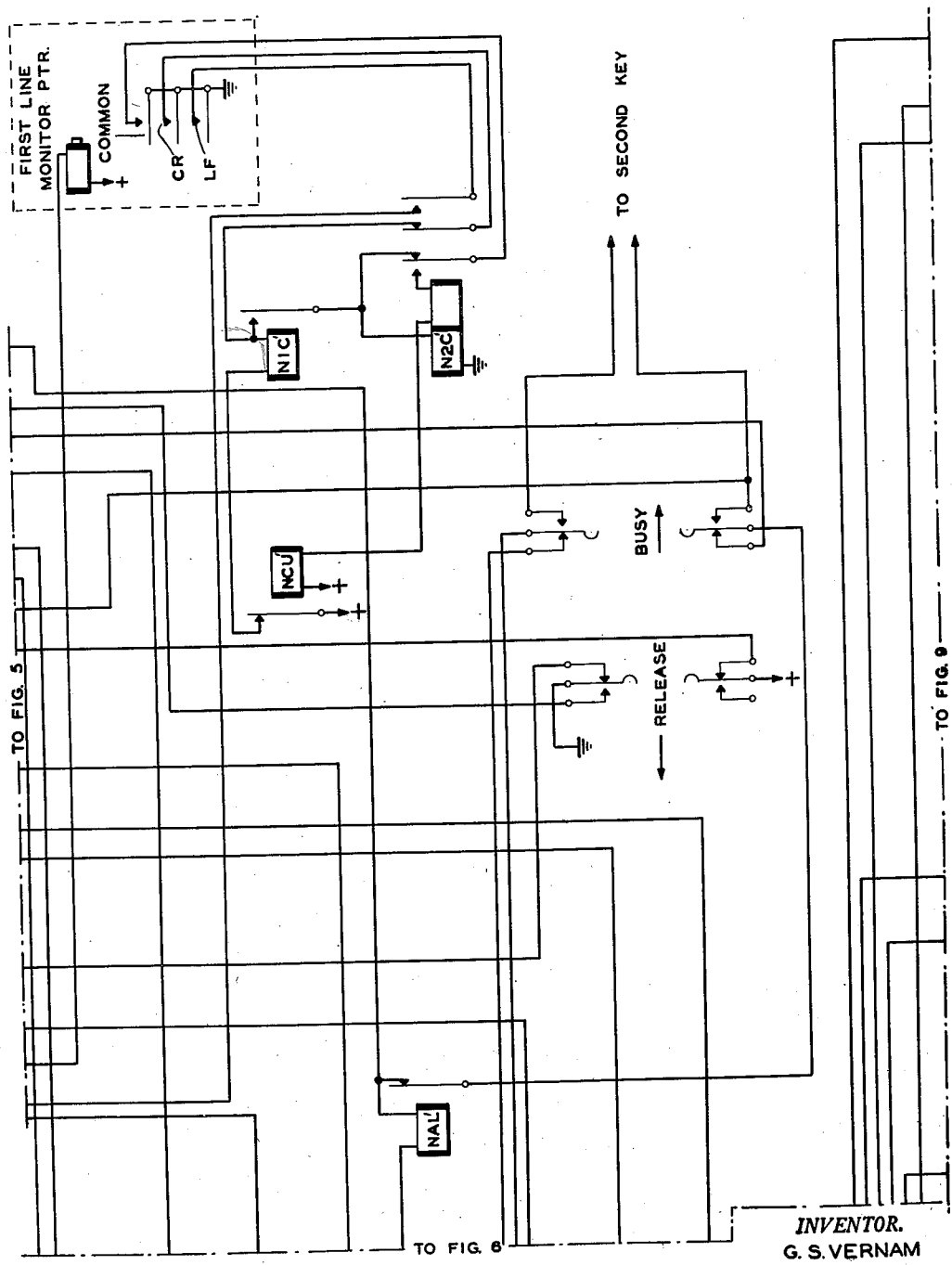
Figure 8:
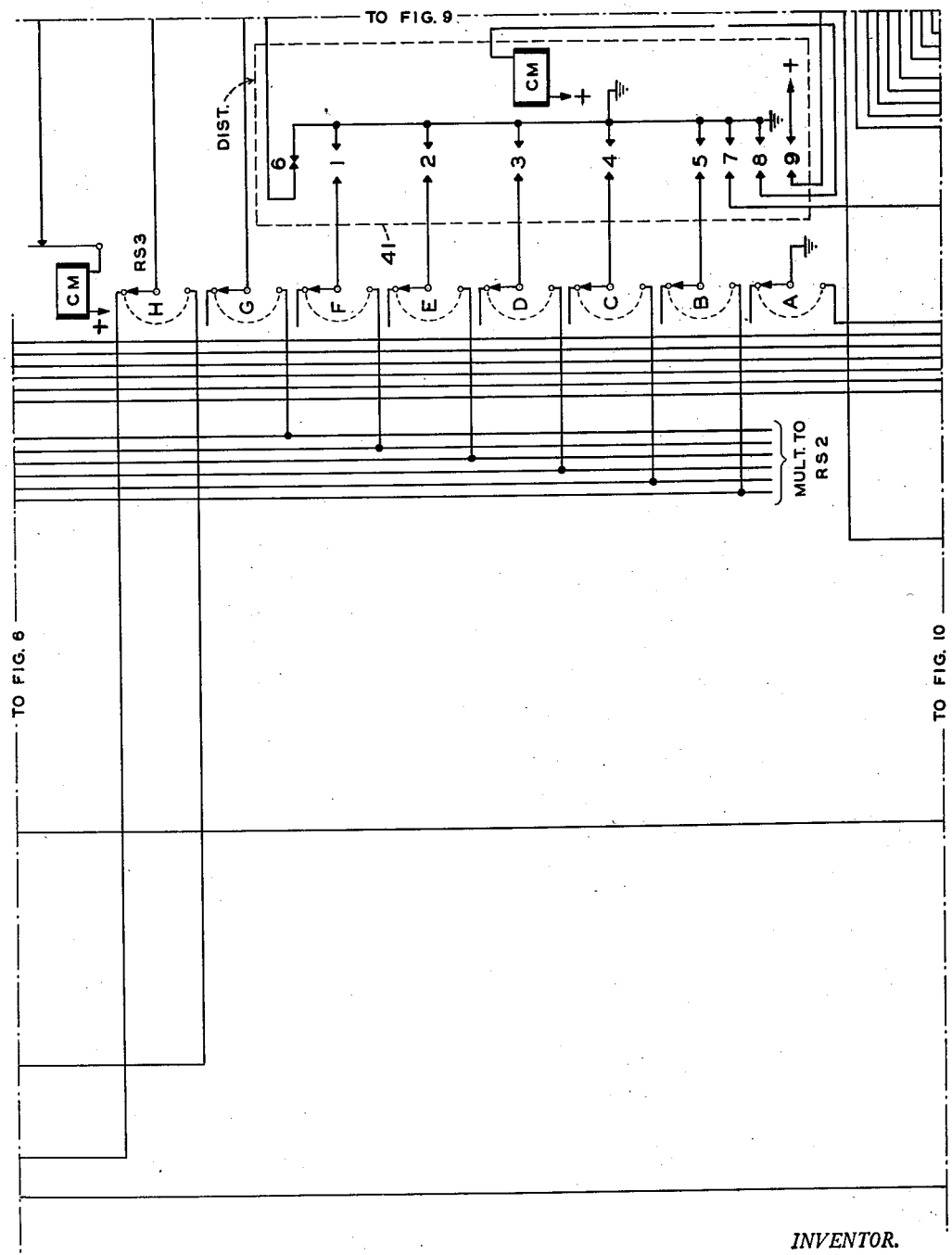

As indicated and shown in the drawings, certain of the bank contacts of rotary switches RS3 and RS8 are multipled to the bank contacts of various other rotary switches including RS1 and RS4. Switches such as RS1 and RS4 of the drawings function in a manner similar to that of rotary switches 1101 and 1206, Figs. 11 and 12 of the above-mentioned copending application, to condition a numbering machine and associate the same with a sending line when a single address message is transmitted theerover. The circuits and equipment associated with the wipers of rotary switches RS1 and RS4 function in a manner analogous to the relays of Figs. 11 and 12 of said application and cause the first line of the single messages to be recorded on the first line monitor printer. Some of the relays of a numbering circuit for a single message transmitter circuit such as those of Figs. 5 and 7 are somewhat similar to those associated with a master transmitter circuit and function in a similar manner. Relays of the single message transmitting circuit are identified by a prime mark in addition to the letter designation.

When transmitting from a receiving position to but a single outgoing line a number of the controls described above employed in transmitting to a plurality of lines are not necessary. However, a number of the relays described above are employed and operate in the same manner. The relays described above necessary for transmission to but a single sending line include relays such as SSC, SCO, SIR, STC, SIS, SLR, STR and SSR to which may be associated relays SMS and SMC although in this instance the latter two relays perform no function. Since the operation of a similar arrangement of relays is fully described in the above-mentioned copending application, this description will not be repeated.

In transmitting from a receiving position to the master sending position, the intra-office transmission circuit is similar to that of a sending line and each such intra-office message has appended thereto a message sequence number which is printed by the first line monitor printer. Thus, each multiple address message has assigned thereto a message sequence number as it is transmitted intra-office and this number is recorded by the first line monitor printer and the sequence numbers of the multiple address message as it is transmitted to the various lines are recorded on the master monitor printer together with the text of the message. These numbers greaty assist in tracing a lost or misdirected message.

While the invention has been described in but a single illustrative embodiment, it will be apparent that various modifications and changes may be made therein without departing from the scope or essential attributes thereof, and it is desired, therefore, that only such limitations be placed thereon as are imposed by the appended claims.

What is claimed is:

1. In a telegraph switching center, a plurality of outgoing transmission circuits, a separate identifying code signal transmitter associated with each of said circuits, a message transmitter, means for adapting said message transmitter to simultaneously transmit to a selected plurality of said circuit, and automatic means for operating the identifying code signal transmitter of the selected circuits one at a time concomitantly with the transmission of a message from said message transmitter regardless of the busy or idle condition of the selected circuits at the time of selection.

2. In a telegraph switching center, a plurality of outgoing transmission circuits, a separate identifying code signal transmitter associated with each of said circuits, a message transmitter, means for operating said identifying code signal transmitters in conjunction with the transmission of each message to a respective circuit, means for selecting a plurality of said circuits for simultaneous transmission thereto of a message from said message transmitter, and automatic means for sequentially operating said identifying code signal transmitters concomitantly with the transmission of a message from said message transmitter regardless of the busy or idle condition of the selected circuits at the time of selection.

3. In a telegraph switching center, a plurality of outgoing transmission circuits, a separate identifying code signal transmitter associated with each of said circuits, a message transmitter, means for operating said identifying code signal transmitters in conjunction with the transmission of each message to a respective circuit, means for selecting a plurality of said circuits for simultaneous transmission thereto of a message from said message transmitter, automatic means for sequentially operating said identifying code signal transmitters concomitantly with the transmission of a message from said message transmitter, a signal recording mechanism, and means including said mechanism for recording the signals transmitted from the identifying code signal transmitters of the selected circuits and from said message transmitter.

4. In a telegraph switching system, a plurality of outgoing transmission lines, a plurality of single message transmitters, means for associating a single message transmitter with an idle line for transmission of a message thereover and for marking a busy line for subsequent association therewith, a master message transmitter, means for marking a plurality of said lines for simultaneous transmission thereto from said master message transmitter, means for seizing the idle ones of said plurality of lines as they are marked and the busy ones as they become idle and means for releasing only the marked busy lines of said plurality of marked lines.

5. In a telegraph switching system, a plurality of outgoing transmission lines, a plurality of single message transmitters, means for associating a single message transmitter with an idle line for transmission of a message thereover and for marking a busy line for subsequent association therewith, a master message transmitter, means for marking a plurality of said lines for simultaneous transmission thereto from said master message transmitter, means for seizing the idle ones of said plurality of marked lines as they are marked and the busy ones as they become idle, an alarm device and means for operating said alarm device when one or more of the marked lines are not seized within a predetermined length of time.

6. In a telegraph switching system, a plurality of outgoing transmission lines, a plurality of single message transmitters, means for associating a single message transmitter with an idle line for transmission of a message thereover and for marking a busy line for subsequent association therewith, an identifying code signal transmitter associated with each outgoing line for appending service signals to each message transmitted thereover, a master message transmitter, means for associating said master message transmitter with a plurality of said lines for simultaneous transmission of a master message thereto, means including the identifying code signal transmitters to append individual service signals to such master messages transmitted to the plurality of lines, a recording mechanism and means to operate said recording mechanism to record the appended service signals and the master message as they are transmitted.

7. In a telegraph switching system, a plurality of outgoing transmission lines, a plurality of single message transmitters, means for associating a single message transmitter with an idle line for transmission of a message thereover and for marking a busy line for subsequent association therewith, an identifying code signal transmitter associated with each outgoing line for appending service signals to each message transmitted thereover, a master message transmitter, means for establishing a pattern of a group of said lines for the simultaneous transmission thereto of a master message from said master message transmitter, means to sequentially operate the identifying code signal transmitter of the lines in said pattern, a recording mechanism and means to operate said recording mechanism to record the appended service signals and the master message.

8. In a telegraph switching system, a plurality of outgoing transmission lines, a plurality of single message transmitters, means for associating a single message transmitter with an idle line and seizing the same for transmission of a message thereover and for marking a busy line for subsequent association and seizure, a master message transmitter, means for marking a pattern of a plurality of said lines for simultaneous transmission thereto from said master message transmitter, means for seizing the idle ones of said plurality of lines as they are marked and the busy ones as they become idle, means for adding a substitute for one or more marked busy lines of said plurality and means for releasing only the busy line or lines from said marked pattern.

9. In a telegraph switching system, a plurality of outgoing transmission lines, a plurality of single message transmitters, means for associating a single message transmitter with an idle line for transmission of a message thereover and for marking a busy line for subsequent association therewith, an identifying code signal transmitter associated with each outgoing line for appending service signals to each message transmitted thereover, a master message transmitter, means for establishing a pattern of a group of said lines for the simultaneous transmission thereto of a master message from said master message transmitter, means to automatically operate in sequential order the identifying code signal transmitter of the lines in said pattern regardless of the busy or idle condition of said lines at the time of establishing said pattern, and means to automatically initiate operation of said master message transmitter following the operation of all of the identifying code signal transmitters of the pattern of lines.

10. In a telegraph switching system, a plurality of outgoing transmission lines, a plurality of single message transmitters, means for associating a single message transmitter with an idle line and for seizing the same for transmission of a message thereover and for marking a busy line for subsequent seizure, a master message transmitter, means for marking a pattern of a plurality of said lines for simultaneous transmission thereto from said master message transmitter, means for seizing the idle ones of said plurality of marked lines as they are marked and the busy ones as they become idle, a single lamp for each of said lines, means for operating the signal lamps of the seized lines of said pattern in one manner and the signal lamps of the busy and unseized lines of said pattern in another manner.

11. In a telegraph switching system, a plurality of outgoing transmission lines, a plurality of single message transmitters, means for associating a single message transmitter with an idle line and seizing the same for transmission of a message thereover and for marking a busy line for subsequent association and seizure, a master message transmitter, means for marking a pattern of a plurality of said lines for simultaneous transmission thereto from said master message transmitter, means for seizing the idle ones of said plurality of lines as they are marked and the busy ones as they become idle, a common release means and means including said release means for releasing only all the marked lines of said pattern that have not been seized.

GILBERT S. VERNAM.

REFERENCES CITED

The following references are of record in the file of this patent:

UNITED STATES PATENTS

| Number | Name | Date |
| --- | --- | --- |
| 2,346,173 | Light | Apr. 11, 1944 |